Aug. 13, 1968  J. H. LEMELSON  3,396,639
REFLECTING DEVICES
Filed Sept. 23, 1965
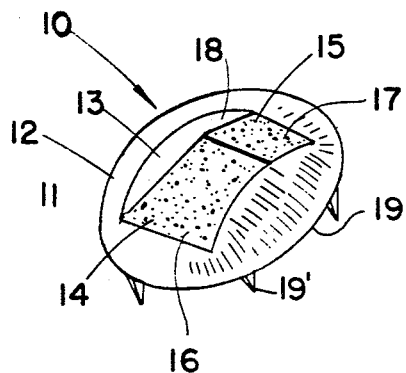
Fig. 1
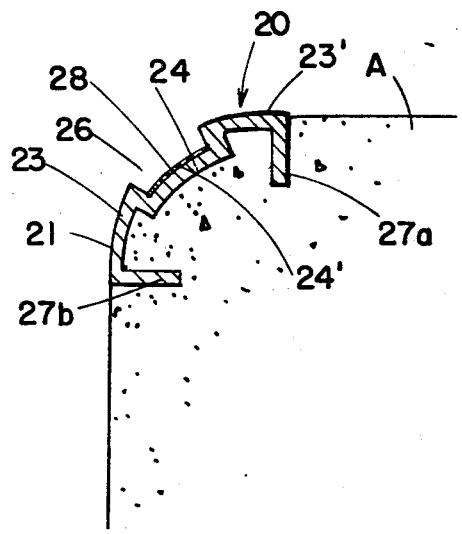
Fig. 2
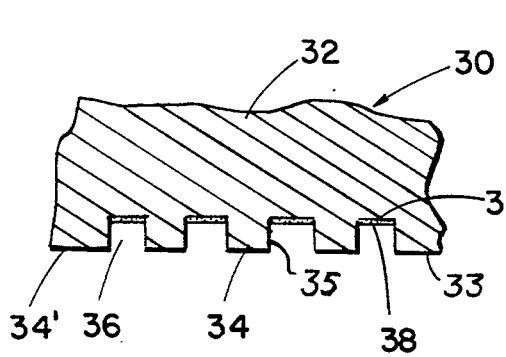
Fig. 3
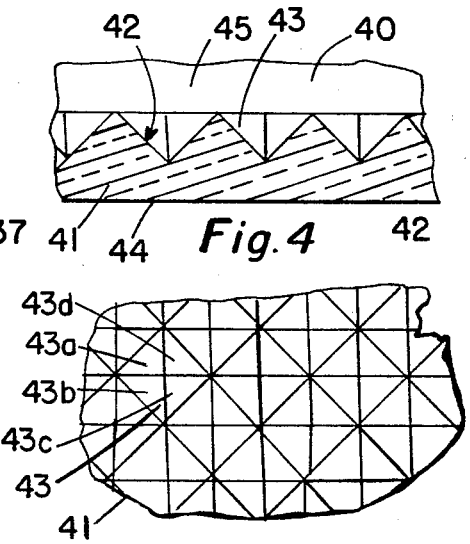
Fig. 4
Fig. 5
INVENTOR.
Jerome H. Lemelson

United States Patent Office 3,396,639
Patented Aug. 13, 1968

3,396,639
REFLECTING DEVICES
Jerome H. Lemelson, 85 Rector St.,
Metuchen, N.J. 08840
Continuation-in-part of application Ser. No. 360,954,
June 11, 1953. This application Sept. 23, 1965, Ser.
No. 489,654
8 Claims. (Cl. 94—1.5)

ABSTRACT OF THE DISCLOSURE

Reflecting display devices are provided which are applicable as delineators or safety reflectors for motor vehicles, roadways and the like. These devices employ a thin layer or sheet of reflex reflecting material containing a multitude of glass spheres embedded in a plastic binder. The material is such that it cannot resist ordinary abrasive forces applied thereto when properly used, by the wheels of a motor vehicle. Accordingly, the devices include a base or support for the sheet reflex reflecting material having means for protecting the material, yet so shaped and designed that the protection means does not substantially interfere with the operation of the reflecting material.

In one form, a reflecting device is shaped to permit its use on the upper surface of a roadway and contains reflex reflecting material which may be viewed by a motor vehicle approaching the device from a plurality of directions. In another form, the device is in the shape of a curb edging containing reflex reflecting material viewable to vehicles traveling the roadway defined by the curb against which it is secured. Other forms include use of the structures defined in the current invention as components of vehicles.

---

This invention relates to devices containing one or more reflecting elements or surfaces and is a continuation-in-part of my copending application Serial No. 360,954 filed June 11, 1953, for Display Devices, now Patent No. 3,220,871. In particular, this invention relates to new and improved reflectors particularly applicable to highway safety.

Various highway safety devices are known in the art for indicating, by the reflection of light from a vehicle's headlamps, the locations of highway dividing lines and the like. Heretofore, these devices have been made of molded plastic or glass having a plurality of flat reflecting surfacs known as retro-reflectors. Such devices have a number of shortcomings limiting their use such as the fact that they may easily crack, shatter or become scratched when struck by stones thrown thereagainst by the wheels of the vehicle or vandals or when run over or otherwise engaged by the wheels of a motor vehicle. Lines on the roadway applied by use of reflecting paint are quite widely used but shortcomings thereof include inability of such paint to resist erosion and wear and its inability to be seen except at short distances due to the extremely acute angle between the surface of the roadway and the beamed light from the headlamps of the vehicles traveling said roadway. It is also known to apply reflex reflecting tape such as the commercially available Scotch-Lite manufactured by the Minnesota Mining & Manufacturing Company of St. Paul, Minn., to the bumpers of a motor vehicle but such material may easily rub or wear off.

It is, accordingly, a primary object of this invention to provide new and improved reflecting devices applicable for improving highway safety.

Another object is to provide new and improved structures in reflectors having substantially improved visual efficiencies when compared with conventional reflectors.

Another object is to provide improved reflecting devices utilizing so-called wide angle reflex reflecting sheet materials applied in a particular manner thereto and containing means for protecting such sheet materials from wear and destruction by forces other than friction.

Another object is to provide a new and improved structure in a reflector applicable to the surfaces of highways and viewable at a substantially greater distance than conventional button reflectors.

Another object is to provide a new and improved structure including a sheet type reflective sheeting applicable to highway curbing or center isle structures for indicating the presence of same at night to a motorist traveling in a vehicle adjacent said curbing.

Another object is to provide improved means for mounting and protecting reflectors of the sheet-type and preventing the destruction of same by wear.

Another object is to provide an improved structure in a vehicle bumper containing integral reflecting strips secured thereto in a manner to protect the strips from wear and destruction.

Another object is to provide a new and improved structure in a retro-reflecting material which is flexible and therefore applicable to irregular as well as flat surfaces.

With the above and such other objects in view as may hereafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed.

FIG. 1 is an isometric view of an improved reflective disc or button applicable to highway surfaces;

FIG. 2 is an end view in cross section of a corner strip containing reflecting means seruced thereto and applicable to highway curbing, dividers and the like;

FIG. 3 is a fragmentary view in cross section of a device such as an automobile bumper, curbing or other structure containing plural reflective strips secured thereto in a manner whereby said strips are protected;

FIG. 4 is a side view in cross section of a fragment of a new and improved retro-reflective sheet material and FIG. 5 is a plan view of the material of FIG. 4.

Turning now to the drawings, there is shown in FIG. 1 a reflective disc or button pin which is particularly applicable to highways such as those paved with concrete, asphalt or other suitable material. The device 10 includes a disc-shaped base 11 having an upper surface 12 of generally convex shape and an indentation 13 disposed in the central portion of the upper surface and extending in a substantial portion thereof. The lower surface 19 of disc 11 is preferably flat and is provided with integrally molded or attached spike-like protrusions 19' operative to be driven into or molded in the highway for preventing shifting of the device 10 once the highway surfacing material has solidified. The cavity or indentation 13 in the upper surface 12 is shown as having two substantially flat bottom surfaces 14 and 15 each of which is angled to the horizontal and each adapted to face substantially in opposite directions of the roadway which are preferbly those directions in which vehicles are traveling parallel and towards each other on opposite sides of the roadway. In other words, surface 14 is canted and facing vehicles traveling in one direction along the roadway while surface 15 is canted and faces vehicles traveling in the opposite direction. Disposed against and preferably bonded to the surfaces 14 and 15 are respective portions 16 and 17 of a reflex reflecting sheet material such as Scotch-Lite. The surfaces 14 and 15 are recessed sufficiently below the upper surface 12 of the disc 11 so as to prevent rubber from the tires of motor vehicles which may run over the device 10 when straying out of lane, from entering and rubbing against reflex reflecting material 16, 17. The surfaces 14 and 15 are thus indented from 1/16″ to 1/4″ or more below the upper surface 12 near the line 15′ dividing surfaces 15 and 16 for discs ranging in diameter from 2″ to 4″ wherein the width of the indentation 13 may vary from 1½″ to 3″. In another structure, it is noted that the indentation 13 may actually comprise a plurality of narrower indentations running parallel to each other and the longitudinal axis of the roadway, each containing reflex reflecting material along its bottom inclined surfaces similar to 14 and 15 and provided in accordance with teachings of FIG. 3 to be described.

Another feature of the reflective disc or button 10 of FIG. 1 is that the base portion 11 thereof may be injection molded of a suitable plastic such as a polyamide, polycarbonate, polysulphone or other suitable plastic resin containing white pigment therein or reflex reflecting beads so as to provide same also easily visible at night.

FIG. 2 illustrates in end-wise cross section the application of a reflecting device 20 in the form of a corner strip having a base 21 made of rolled or extruded metal such as steel or suitable plastic and a strip of reflex reflecting sheet material 28 disposed in a central portion of base 21. The said central portion is defined by an indentation 26 in the corner strip 21 which indentation is centrally disposed and contains a bottom wall 24, side walls 25 and 25′ and extensions 23 and 23′ of said side walls which conform to the upper and side wall portions of the curbing A. Legs 27a and 27b extend at substantially right angles to the side wall portions 23 and 23′ and project into the material of the curbing A for anchoring the device 20 in place. The legs 27a and 27b may extend substantially the entire length of the corner strip 20 or may comprise individual projecting portions of limited length such as the spike formations 19′ of FIG. 1. The depth of indentation 26 is preferably in the order of 3/32″ or more in depth so as to provide the portions 23 and 23′ of the strip protecting the strip 24 of reflex reflecting material from contact with the wheels or tires of the motor vehicle rubbing thereagainst in the event that the vehicle inadvertently or otherwise strikes the curbing A. Thus the material 24 will not easily be torn or rubbed out of the channel 26 which would occur if it were exposed on an outer surface of the strip. Notation 24′ defines a suitable adhesive binding the reflex reflecting particles together and against the upper surface of the bottom wall 28 of the channel or to an adhesive material bonding the reflex reflecting strip 24 thereto.

The structure in FIG. 2 may also be modified as hereinafter described whereby the single channel 26 may be replaced by a plurality of narrower channels running parallel to each other longitudinally along the strip. Two or more of such channels may extend along the central portion of the surface shown and/or along the side portions 23 and 23′ thereof with each containing a strip of reflex reflecting material bonded to the bottom flat surface of the identation so as to provide a reflecting band to the observer of a vehicle traveling parallel to said corner strip at night when the light from his vehicle's headlamps is reflected back.

In FIG. 3 is shown a structure in a device 30 which may comprise a metal, plastic or ceramic material applicable to highway dividers, curbing or motor vehicles. For example, the device 30 may comprise a portion of a vehicle front or rear bumper made of metal and suitably plated. Provided in the outer surface 33 of the base 32 are a plurality of parallel, strip-like channels 36 each having a flat bottom surface 37 against which is bonded a respective strip 38 of reflex reflecting material such as Scotch-Lite sheeting or coatings of plastic binding materials containing retro-reflecting glass beads in the order of .002–.005″ in diameter. The reflective strips 38 preferably cover or coat the entire flat bottom walls 37 of the channels 36 and are sufficiently beneath the surface 33 to be protected against rubbing wear from the vehicles or bumper of another vehicle by land portions 34 disposed between each of the channels 36. Notation 35 refers to the side walls of the channels 36 which are preferably normal or taper outwardly from the bottom wall 37 so as to permit light entering said channels over a wide range of angles to be retro-reflected back to the vehicle from which they originated. If the walls 35 are so tapered, they may also be coated or covered with strips of retro-reflective material as described.

In a typical construction applicable to automobile bumpers, curbing plates, dividers and the like, the channels 36 may range in thickness from 1/8″ to 1/2″ in thickness and 1/16″ to 1/4″ deep. For example, channels 1/8″ thick separated by lands such as portions 34 which are 1/8″ to 1/4″ wide may be provided which are 1/16″ deep thereby affording sufficient protection to the retro-reflecting material 38 bonded against the bottom wall 37 of each channel. If the channels 36 are 1/4″ wide, they are preferably 1/8″ deep or greater so as to prevent deformation of the rubber from the wheels of the vehicle therein to a degree such as to rub off the material 38 from the bottom wall 37 of each channel.

Several methods for producing the reflecting structure illustrated in FIG. 3 are noted as follows. In a first method, the base 32 is a metal such as aluminum or steel and channels 36 are automatically machined therein by a plurality of cutting blades such as a suitably shaped milling tool cutter or cutters. Immediately after cutting said channels 36 in the base 32, reflex reflecting material in the form of strips of reflective sheeting or strip-like coatings are disposed against the bottom walls 37 of the channels bonding the reflecting material thereto. If plating or anodizing is required, it may precede the operation in which the channels are formed prior to bonding strips 38 thereto or effected after the strips are so disposed.

If the base material 32 comprises a highway material such as portland cement or other mortar, the channels 36 may be formed therein by suitable casting molds or means for embossing the surface 33 prior to its complete solidification which embossing means includes spraying or laying the strips 38 against the bottom walls 38 of each channel preferably with an adhesive which is operative to bond the bottom face of each strip thereagainst.

FIG. 4 illustrates a side view of a fragment of a new type of retro-reflective sheet material 40 applicable to the devices hereinbefore described or to any suitable display or sign construction. The reflector 40 comprises a base sheet 41 having one surface 42 thereof formed with a plurality of pyramid-like indentations 43 therein. Each indentation 43 has a plurality of surfaces 43a, 43b, 43c and 43d each of which is substantially an equilateral triangle forming a pyramidal indentation having four surfaces each of equal area defining triangles of equal sides, in planes normal to each other. The base sheet 41 may be utilized per se or may be abutted against a second sheet 45 which serves to support and/or protect the triangular surfaces of the indentations 43 during use. Material of which base sheet 41 is made may comprise such flexbile plastics as polyvinyl chloride, polyvinyl acetate or the like. It may also comprise cellulose acetate, rigid vinyl, acrylic, etc. Sheet 45 may be transparent or opaque depending on whether light to be retro-reflective passes through 45 or enters the other flat surface 42′ of base sheet 11. If surfaces 43a–43d are highly smooth and reflective, light entering the sheet from either surface over a wide range of angles will reflect off the surfaces of the indentations and will be retro-reflected back to the source without substantial loss of light energy.

In a preferred structure, to enhance the reflective characteristics of the device 40, the surfaces 43a–43d of each pyramidal indentation 43 may be metallized with a thin film of metal such as aluminum vapor deposited thereon by conventional metallizing techniques to a depth of approximate four-millionths of an inch. Thereafter the provision of member 45 against the surface 42 may be used to protect the metallized surface or a clear plastic coating may be disposed over the metallized layer by spraying or other means.

FIG. 5 illustrates the structure of FIG. 4 in plan view with the capping sheet 45 removed from surface 42. While structures somewhat like the device of FIGS. 4 and 5 have been produced by injection molding, they have been extremely limited in size to reflectors, for example, which are less than 6" in diameter. This has been primarily due to the fact that shrinkage of the plastic or glass from which the molded article is produced must be held to a fine tolerance and attempts to injection mold larger sizes have resulted in shapes in which shrinkage can not be so controlled as to permit all of the pyramidal indentations to perform as retro-reflection means. Accordingly, a technique is hereby proposed for forming the sheet material 40 of FIGS. 4 and 5 by an embossing technique which will be hereinafter referred to as "high pressure embossing."

Conventional embossing of glass or plastic involves providing said material to be embossed in a semi-molten condition in sheet form and passing the sheet of semi-molten plastic material between at least two rolls, one of which is an embossing roll. After the embossing roll has made limited contact with one surface of the sheet is removed on to a powered or gravity conveyor and allowed to solidify in the atmosphere with little if any control being effected over shrinkage. Accordingly, different portions of the sheet may shrink different degrees and sufficient control is not provided permitting the production of a sheet structure similar to retro-reflective sheeting 41 of FIGS. 4 and 5. Accordingly, it is hereby proposed to provide an embossing machine setup in which the sheet of material being embossed is retained against the surface of the embossing roll or drum, under substantial pressure, for a substantial portion of tis rotation by one or both of two means. In a first means, a sheet of metal such as stainless steel is formed in an endless belt configuration and is fed to the bite of the embossing roll and a plurality of rolls disposed around the embossing roll with the sheet of plastic or glass fed between said stainless steel sheet and the embossing roll and retained by the stainless steel sheet which is driven at substantially the same speed as the surface of the embossing roll, against said embossing roll surface for a substantial portion of the rotation of the embossing roll. While this occurs, portions of the stainless steel and/or the embossing roll which are downstream of the bite of the roll are cooled so as to rapidly cool the embossed sheet while it is still maintained under pressure against the embossing roll, thereby controlling shrinkage against a substantial portion of the width of the sheet being embossed. Thus the material of the sheet being embossed is not permitted to warp and is maintained under pressure while it solidifies.

I claim:
1. A light-reflecting marker element having a body member with a convex upper surface and an elongated channel indentation in said upper surface, the bottom surface of said channel indentation having a center portion which is raised above the side edges and a reflex-reflecting material secured to the bottom of said channel indentation.

2. A marker element in accordance with claim 1 wherein said reflex-reflecting material is a sheet material bonded to the bottom surface of said channel indentation.

3. A marker element in accordance with claim 1 wherein said reflex-reflecting material comprises glass beads disposed in a coating which is adhesively bonded to the bottom of said channel indentation.

4. A marker element in accordance with claim 1 wherein the bottom surface of the channel indentation is convex in shape.

5. A marker element in accordance with claim 1 wherein the bottom surface of said channel indentation has a center ridge and flat inclined surfaces extending from the outer edges of said channel to said raised center portion.

6. A marker element in accordance with claim 1 wherein said body member is elongated in shape.

7. A marker element in accordance with claim 1 wherein said body member is circular in shape.

8. A curb-protector for use on highways and the like comprising an elongated body member adapted to be secured to the upper corner of a road curb,
    an elongated channel indentation extending along the length of said elongated body member, and
    reflex-reflecting material secured to the bottom of said channel indentation and adapted to be inclined to the vertical surface of said curb.

References Cited
UNITED STATES PATENTS

| | | | |
|---|---|---|---|
| Re. 16,131 | 8/1925 | Cretney | 94—1.5 |
| 1,245,689 | 11/1917 | Davis | 94—32 |
| 1,659,830 | 2/1928 | Moyer | 94—32 |
| 1,698,594 | 1/1929 | Hoff | 94—1.5 |
| 1,850,370 | 3/1932 | Arey | 94—1.5 |
| 2,050,435 | 8/1936 | Howard | 293—69 |
| 2,176,285 | 10/1939 | Whiting | 94—1.5 |
| 2,294,930 | 9/1942 | Palmquist. | |
| 2,579,467 | 12/1951 | Brickman | 94—1.5 |

FOREIGN PATENTS

| | | |
|---|---|---|
| 485,940 | 5/1938 | Great Britain. |

JACOB L. NACKENOFF, *Primary Examiner.*